United States Patent
Reynolds et al.

(10) Patent No.: US 12,117,780 B2
(45) Date of Patent: Oct. 15, 2024

(54) SUPPLYING HMI SNAPSHOTS FROM INDUSTRIAL AUTOMATION ENVIRONMENTS AS INPUT TO MACHINE LEARNING MODELS

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Jeffrey S. Sperling, Downingtown, PA (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 413 days.

(21) Appl. No.: 17/484,364

(22) Filed: Sep. 24, 2021

(65) Prior Publication Data
US 2023/0099239 A1    Mar. 30, 2023

(51) Int. Cl.
*G06T 7/00* (2017.01)
*G05B 13/02* (2006.01)

(52) U.S. Cl.
CPC ........ *G05B 13/0265* (2013.01); *G06T 7/0004* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2019/0056962 A1* | 2/2019 | Ng | G06F 9/452 |
| 2022/0067913 A1* | 3/2022 | Lutz | G06N 3/08 |
| 2023/0110483 A1* | 4/2023 | Thakkar | G05B 19/4184 700/28 |

* cited by examiner

*Primary Examiner* — Paul B Yanchus, III

(57) ABSTRACT

Various embodiments of the present technology generally relate to integrating machine learning models into industrial automation environments. More specifically, embodiments of the present technology include systems and methods for implementing machine learning models within industrial control code to improve performance, increase productivity, and add capability to existing control programs. In an embodiment, a system comprises a screen capture component configured to capture images of a human-machine interface in an industrial automation environment, wherein the one or more images include at least one visual depiction of data collected from an industrial device. The system further comprises an input component configured to provide the images to a machine learning model configured to analyze an operating condition of the industrial device. The system also comprises a determination component configured to, based on an output of the machine learning model, identify a current operating condition of the industrial device.

18 Claims, 12 Drawing Sheets

SUPPLYING HMI SNAPSHOTS FROM INDUSTRIAL AUTOMATION ENVIRONMENTS AS INPUT TO MACHINE LEARNING MODELS

BACKGROUND

Industrial manufacturing environments generate huge quantities of data at very fast speeds making the extraction of enterprise-level insights challenging. In industrial automation environments, control systems are used to drive various operations along an industrial line. Control code is used by industrial drives or programmable logic controllers to drive industrial assets, devices, and sensors in an industrial process. Operational data produced during runtime contains important information about the status, performance, or quality of the industrial process, but can be difficult to leverage in real time given the enormous amount of computing power and time that goes into operational analytics. Moreover, control programs are typically developed by programmers prior to implementation and the ability to adjust control programs after implementation or during runtime is limited. Manually editing control programs in response to various information in operational data can be an extremely difficult and time-consuming process that requires intimate knowledge of data science and process control. Automating the editing of control program can be even more difficult.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used.

It is with respect to this general technical environment that aspects of the present disclosure have been contemplated. Furthermore, although a general environment is discussed, it should be understood that the described examples should not be limited to the general environment identified in the background.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. More specifically, embodiments of the present technology include systems and methods for implementing machine learning models within industrial control code to improve functionality and increase autonomy of industrial control systems. In an embodiment of the present technology, a system for analyzing operating conditions in industrial automation environments comprises a memory that stores executable components and a processor, operatively coupled to the memory, that executes the executable components. The executable components comprise: a screen capture component configured to capture one or more images of a human-machine interface in an industrial automation environment, wherein the one or more images include at least one visual depiction of data collected from an industrial device in the industrial automation environment, an input component configured to provide the one or more images to a machine learning model configured to analyze an operating condition of the industrial device in the industrial automation environment, and a determination component configured to, based on an output of the machine learning model, identify a current operating condition of the industrial device.

In some embodiments, the executable components further comprise a control component configured to edit control logic for the industrial device based at least in part on the output of the machine learning model. The current operating condition may be, in some examples, indicative of an issue related to performance of the industrial device. In one embodiment, the executable components further comprise an image capture component configured to capture one or more images of the industrial device, the input component further configured to provide the one or more images of the industrial device to a different machine learning model configured to analyze a different operating condition of the industrial device in the industrial automation environment, and the determination component further configured to, based on an output of the different machine learning model, identify a different current operating condition of the industrial device. Alternatively, the executable components further comprise an image capture component configured to capture one or more images of the industrial device, the input component further configured to provide the one or more images of the industrial device to the machine learning model configured to analyze the operating condition of the industrial device in the industrial automation environment, and the determination component further configured to, based on the output of the machine learning model, identify the current operating condition of the industrial device. In some embodiments, the machine learning model comprises a convolutional neural network. The executable components can further comprise a training component configured to train the machine learning model to identify operating conditions of the industrial device based on the one or more images of the human-machine interface.

In an alternative embodiment, a non-transitory computer-readable medium has stored thereon instructions to support analyzing operating conditions. The instructions in response to execution, cause a system comprising a processor to perform operations, the operations comprising capturing one or more images of a human-machine interface in an industrial automation environment, wherein the one or more images include at least one visual depiction of data collected from an industrial device in the industrial automation environment. The operations further comprise providing the one or more images to a machine learning model configured to analyze an operating condition of the industrial device in the industrial automation environment and, based on an output of the machine learning model, identifying a current operating condition of the industrial device.

In yet another embodiment, a method for analyzing operating conditions in industrial automation environments comprises capturing, by a system comprising a processor, one or more images of a human-machine interface in an industrial automation environment, wherein the one or more images include at least one visual depiction of data collected from an industrial device in the industrial automation environment. The method further comprises providing, by the system, the one or more images to a machine learning model configured to analyze an operating condition of the industrial device in the industrial automation environment, and, based on an output of the machine learning model, identifying, by the system, a current operating condition of the industrial device.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
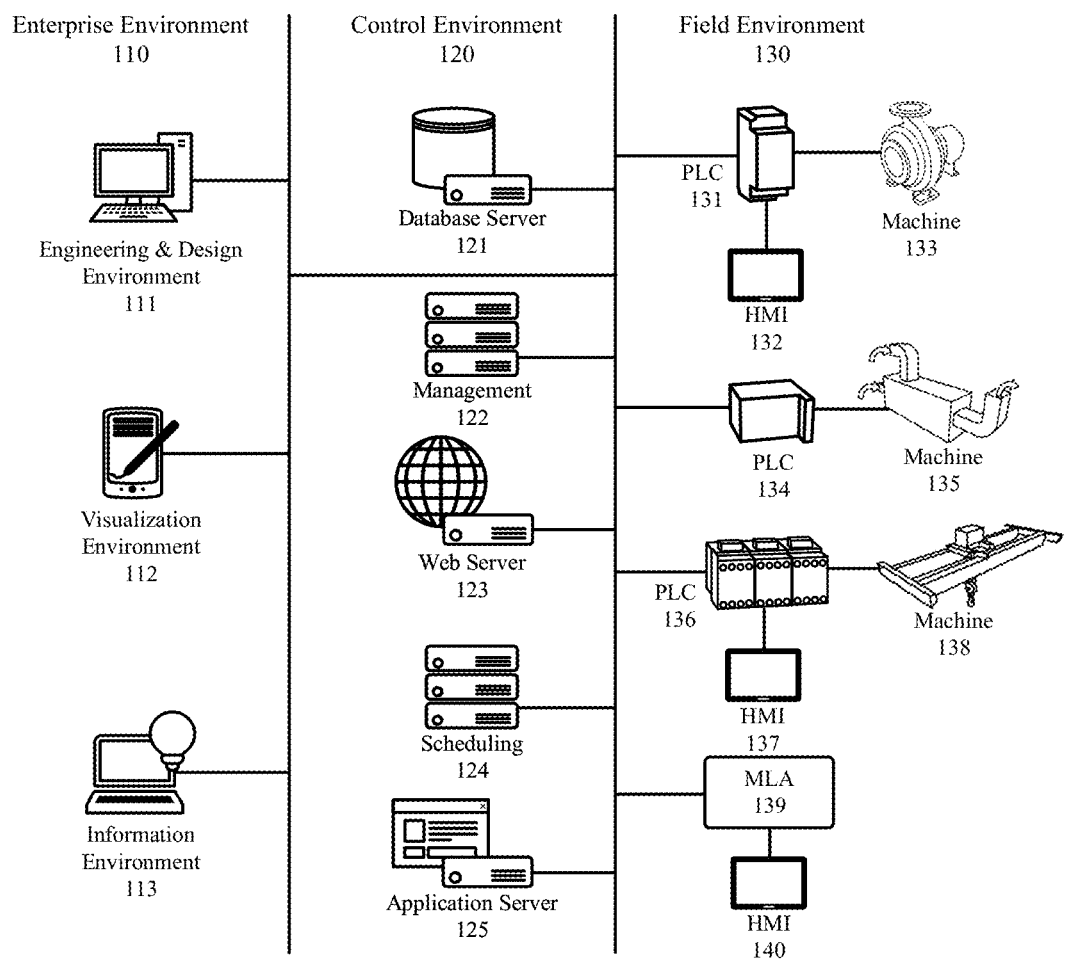
FIG. 1 illustrates an example of an industrial automation environment in which some embodiments of the present technology may be implemented.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for implementing machine learning models within industrial control code to improve performance, increase productivity, and add functionality to existing control programs. Generally, industrial control code provides instructions for controlling and performing certain operations within an industrial environment via controllers (e.g., programmable logic controllers or "PLCs"), wherein the controllers execute the control code to control downstream devices and machinery.

The present technology serves to greatly enhance industrial control by enabling the use of machine learning models within control code for more advanced control. Many programmers responsible for generating control code, however, lack the expertise, resources, or time to write and train their own machine learning models for use within their target environment. Thus, in an implementation of the present technology, machine learning models may be pre-packaged and provided to programmers in the industrial control programming environment just as another industrial asset may be. For example, a control code programming environment may traditionally allow a programmer to "drag and drop" known industrial assets into the process being programmed, wherein the selected asset may come with pre-set parameters and/or settings. The programmer can then connect the asset to other assets, devices, models, inputs, or outputs when building the process. In a similar way, a programmer, in accordance with the present disclosure, may "drag and drop" a machine learning model into the process being programmed, wherein the selected model may similarly come with pre-set parameters, training, and/or settings. The programmer can then connect the model to other assets, devices, models, inputs, or outputs when building the industrial process, as well as apply logic to its input or output. In many examples herein, the model is integrated in a closed loop environment—given that much industrial processes are closed-loop processes—wherein the output of the model is factored into the control logic itself. However, a machine learning model in accordance with the present disclosure may be in communication with external networks providing additional data.

Thus, the provided models are capable of being added into a program using the same input/output (I/O) capabilities as other industrial assets. In accordance with the present disclosure, data scientists may develop and release new machine learning models, which then become available as I/O devices in a programming menu in the same manner as any other device or asset—such as controller and sensors. A programmer may, in an example, be able to add a provided model to a control line via the control program as well as set up inputs and outputs to and from the model. Preferably, the model's outputs adhere to the same paradigm as any other available device such that they can be tagged and usefully integrated into the program.

In an embodiment, a model may consume data relevant to live operations within an industrial automation environment and provide an output that assists the control program in controlling assets based on the consumed data. For example, an input to the machine learning model may be data from a temperature sensor monitoring ambient air temperature within a milk cooling process. In response to input from the temperature sensor, the model may determine that, due to variability on the temperature sensor, the line (i.e., the cooling process) should be slowed down a certain amount to improve output quality. Thus, output from the model may direct an industrial drive to properly slow down the process to achieve a higher quality output.

In an alternative example, a model implemented in a beverage production line receives input from an economic survey on beverage consumption. Based at least in part on the beverage consumption information, the model provides an output that is used as a parameter in the control logic being executed on the line. Thus, when the model predicts a slowdown in beverage consumption, it's prediction can be factored into control logic to slow down the line.

In accordance with the present disclosure, a machine learning model comprises one or more machine learning algorithms that are trained based on historical data and/or training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. A machine learning asset, in some examples, outputs a decision regarding a mode in which the industrial process should be run, wherein that output can be used to adjust parameters and/or settings for controlling the process. In other examples the machine learning asset outputs the determined parameters and/or settings directly for integration into the control code. Other outputs with a similar purpose may exist and are contemplated herein.

Machine learning models may be implemented to perform asset and/or optimization in industrial automation environments. That is, models are used to edit control code such that a device or process is optimized according to a specific control scheme. For example, models can be trained and used to optimize performance, yield, energy consumption, cost, or similar.

Moreover, machine learning models may be implemented to assist in model lifecycle management. A model inherently has a useful lifecycle as the environment around it changes. Over time, models become ubiquitous and can, in essence, wear out, just like any other machine or sensor on an industrial line. Thus, machine learning is utilized to track and/or recognize error between predictive and actual outcomes for purposes of process performance management and/or autonomous manufacturing. In accordance with the present disclosure, machine learning is used for lifecycle management of models that are focused on the closed-loop control of assets in production lines and manufacturing—an may be used in autonomous manufacturing environments.

To accompany the use of control program integrated models, corresponding faceplates are contemplated herein to provide intuitive representations and interfaces to models on-site. A machine learning model faceplate may comprise basic controls and/or visuals relevant to the model that can be utilized and accessed within the control environment. In this manner, provided machine learning can be brought into the on-site user experience more fully as well as into the programming environment. For example, an operator can view or use a model faceplate on a kiosk within the industrial automation environment to perform a task such as turning the model on or off, disconnecting the model from the line, or monitoring the model. The faceplate, in just a few examples, may also be useful for performing slightly more complex tasks such as offsetting parameters, providing inputs, tuning parameters of the model, overriding the model, or checking the status of the model.

FIG. 1 illustrates an example of an industrial automation environment that may be representative of industrial automation environments as discussed herein. The industrial automation environment of FIG. 1 comprises enterprise environment 110, control environment 120, and field environment 130. The industrial automation environment of FIG. 1 may include fewer or additional sub-environments than those shown. Likewise, the sub-environments of the industrial automation environment of FIG. 1 may include fewer or additional components, assets, or connections than shown.

Enterprise environment 110 comprises engineering and design environment 111, visualization environment 112, and information environment 113. Control environment 120 comprises database server 121, management servers 122, web server 123, scheduling server 124, and application server 125. Each of database server 121, management servers 122, web server 123, scheduling server 124, and application server 125 may be representative of a single server or a plurality of servers. Field environment 130 comprises PLC 131, which is coupled to human-machine interface (HMI)

132 and machine 133. Field environment 130 also comprises PLC 134, which is coupled to machine 135. Field environment 130 further comprises PLC 136, which is coupled to HMI 173 and machine 138. Field environment 130 also comprises machine learning asset (MLA) 139, which is coupled to HMI 140.

In some examples, engineering and design environment 111 is representative of any connected devices or environments on which control logic is programmed for operating devices in field environment 130. Visualization environment 112 is representative of any connected devices or environments on which operational data is viewed and/or analyzed. Information environment 113 is representative of any connected devices or environments on the enterprise level on which any other industrial automation information relevant to field environment 130 can be viewed, processed, analyzed, generated, or the like. Assets of control environment 120 are illustrative in nature such that one, none, or any combination of known server types may be in communication with the industrial automation environment of FIG. 1. Similarly, field environment 130 is illustrative in nature such that one, none, or any combination of assets may be present.

Each of PLC 131, PLC 134, and PLC 136 is representative of one or more programmable logic controllers, which may be coupled to one or more devices, machines, sensors, actuators, interfaces, or other asset types. Each of machine 133, machine 135, and machine 138 is representative of any industrial machine relevant to the industrial automation environment of FIG. 1. Each of HMI 132, HMI 137, and HMI 140 is representative of any form of human-machine interface on which a user or operator in field environment 130 can view and/or interact with connected assets.

Machine learning asset 139 is representative of any machine learning model implemented within the industrial automation environment of FIG. 1 as described herein. As previously discussed, machine learning asset 139 may take input from field environment 130 or external sources, such as any server in control environment 120, to generate an output useful to controlling any processes or assets in field environment 130. Machine learning asset 139 may be implemented in a fully closed-loop process or may receive external data for use in generating predictions and/or outputs.

Figure 2A:
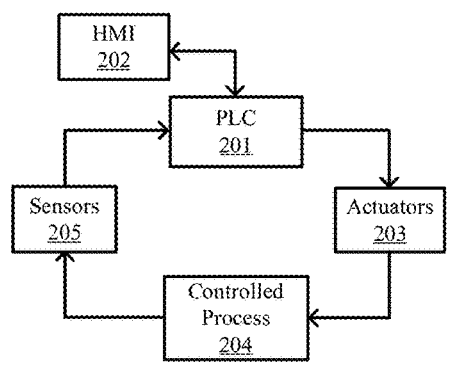
FIG. 2A illustrates an example of a PLC-driven loop for controlling an industrial automation process in accordance with some embodiments of the present technology.
Figure 2B:
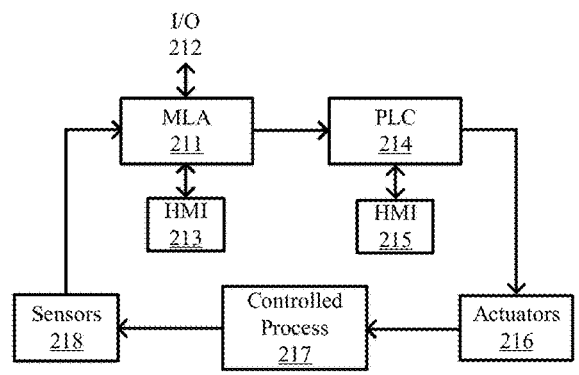
FIG. 2B illustrates an example of a PLC-driven loop that includes a machine learning asset in accordance with some embodiments of the present technology.
Figure 2C:
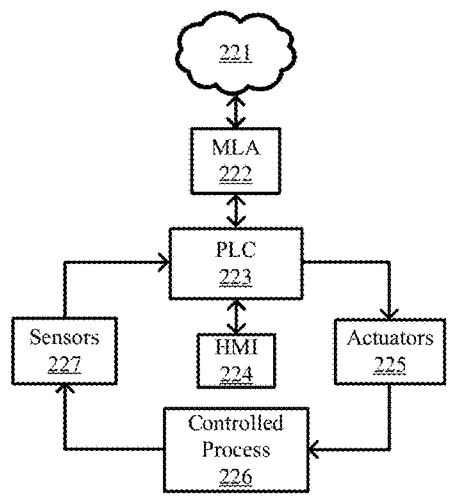
FIG. 2C illustrates an example of a PLC-driven loop that includes a machine learning asset in accordance with some embodiments of the present technology.
Figure 2D:
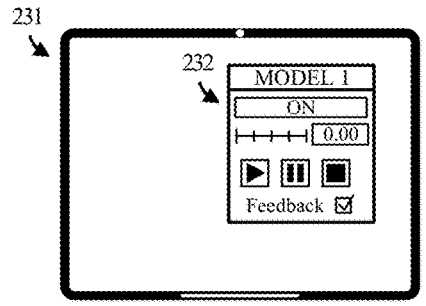
FIG. 2D illustrates an example of an HMI associated with a machine learning asset in accordance with some embodiments of the present technology.

FIG. 2A illustrates an example of a typical PLC-driven loop for controlling an industrial automation process. FIG. 2A includes PLC 201, HMI 202, actuators 203, controlled process 204, and sensors 205. PLC 201 provides output that drives actuators 203. Actuators 203 actuate controlled process 204. Sensors 205 capture output data from controlled process 204 and provide that data back to PLC 201 to complete the loop. PLC 201 is coupled to HMI 202, which may present data for operator viewing or enable operator action affecting the process (e.g., adjusting parameters). FIG. 2A provides an example of a system that runs an industrial process prior to implementation of the disclosed technology. FIGS. 2B-2D illustrate the beneficial inclusion of machine learning models in such industrial processes.

FIG. 2B illustrates an example of one way in which a machine learning model may be integrated into a PLC-driven loop for controlling an industrial automation process. The loop of FIG. 2B comprises machine learning asset 211, input/output (I/O) 212, HMI 213, PLC 214, HMI 215, actuators 216, controlled process 217, and sensors 218.

Machine learning asset 211 is representative of any machine learning asset in accordance with the present disclosure and may receive or send data via I/O 212. As previously discussed, machine learning asset 211 may comprise one or more machine learning algorithms trained to produce output usable by PLC 214 based on input from I/O 212 and/or input from sensors 218. Machine learning asset 211 is coupled with HMI 213, wherein HMI 213 may include a display that provides a graphical representation of the machine learning asset in industrial automation environment. The graphical representation may include one or more visual indicators relevant to the machine learning asset, such as visual indicators of input, output, status, or other metrics. In some examples, the HMI comprises a faceplate for viewing or use by an operator or similar user within the field environment. The HMI may include a computer, a mobile device, a kiosk, a touchscreen device, or any similar computing device capable of performing the HMI functions described herein.

PLC 214 is coupled to HMI 215, wherein HMI 215 also includes a display that provides a graphical representation relevant to PLC 214. In the present example, PLC 214 receives an output from machine learning asset 211. In some embodiments, the output from machine learning asset 211 is the direct output or prediction from the machine learning model. PLC 214 controls controlled process 217 by directing actuators 216 based on process code. Actuators 216 actuate controlled process 217. Sensors 218 collect data from controlled process 217 and provide some or all of the collected data back to machine learning asset 211. Sensors 218 may provide collected data to additional assets as well, such as PLC 214 or external assets not shown in FIG. 2B.

FIG. 2C illustrates an additional example of one way in which a machine learning model may be integrated into a PLC-driven loop for controlling an industrial automation process. The loop of FIG. 2C comprises external network 221, machine learning asset 222, PLC 223, HMI 224, actuators 225, controlled process 226, and sensors 227. In some examples, the loop of FIG. 2C further comprises an additional HMI coupled to machine learning asset 222. In the example of FIG. 2C, machine learning asset 222 is in communication with external network 221, which may comprise a local area network, a wide area network, a cloud network, the Internet, or similar. Machine learning asset 222 receives or collects data from external network 221 and uses that data as input to the one or more machine learning algorithms within machine learning asset 222. Machine learning asset 222 then provides its output to PLC 223 in the form of a prediction, a determination, control parameters, or the like. PLC 223 then controls controlled process 226 based at least in part on the output from machine learning asset 222 via actuators 225. Sensors 227 collect data from controlled process 226 and provide that data to PLC 223 and to additional places in some examples. In an embodiment, data collected by sensors 227 is also provided to machine learning asset 222 and used as input.

FIG. 2D illustrates an example of an HMI for a machine learning asset in an industrial automation environment. HMI 231 is representative of any computing device capable of acting as an interface between industrial data relevant to a machine learning asset and a user in the industrial environment. HMI 231 may be implemented on a tablet, laptop, desktop computer, mobile device, kiosk, or similar. HMI 231 may be representative of HMI 140, HMI 213, HMI 224, or other HMI versions for machine learning assets as discussed herein. HMI 231 is displaying faceplate 232, wherein faceplate 232 provides information relevant to the machine learning asset to which HMI 231 is communicatively coupled. Faceplate 232 provides information relevant to the status of the machine learning asset as well as basic options for controlling or adjusting the machine learning asset from within the field environment. In an example, an operator may view faceplate 232 for information about the current status of the machine learning asset or may use controls provided on faceplate 232 for adjusting and/or controlling the machine learning asset.

Figure 3:
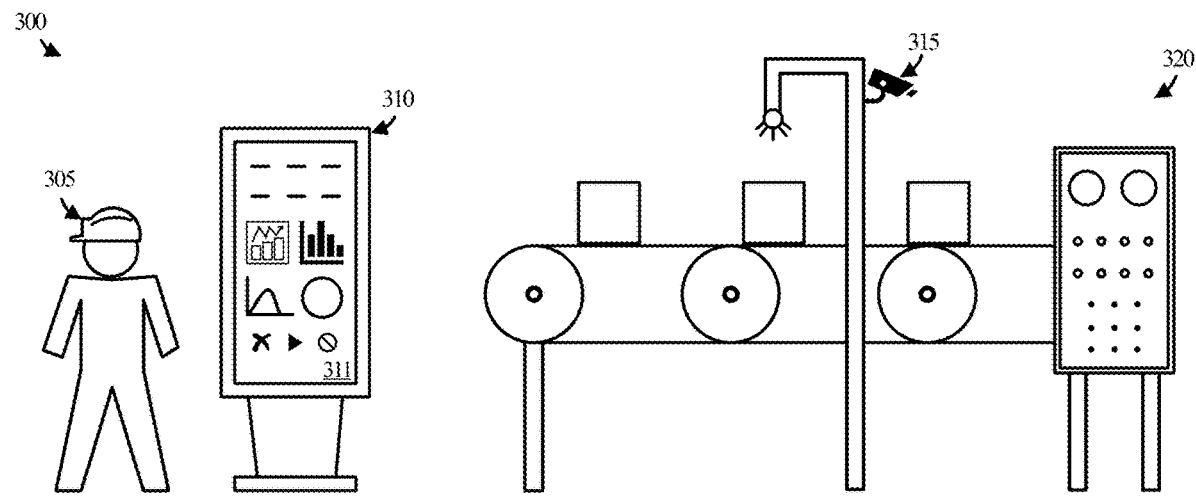
FIG. 3 illustrates an industrial automation environment in which one or more machine learning assets may be utilized in accordance with some embodiments of the present technology.

FIG. 3 illustrates an industrial automation environment in which one or more machine learning assets may be utilized to predict or control an industrial process based on live HMI snapshots and/or captured images of the industrial process itself. FIG. 3 includes industrial automation environment 300, wherein industrial automation environment 300 comprises operator 305, HMI 310 comprising display 311, camera 315, and industrial line 320.

In certain environments and circumstances, there is additional information or subtleties that can be captured through visual inspection of an HMI (e.g., display 311) and the actual production environment (e.g., images of industrial line 320 from camera 315). In the past, operators have used their own inspection and knowledge to assist manufacturing processes in ways that are not or cannot typically be derived through data analysis. Thus, machine learning assets can be used for visual inspection of HMIs and/or the line itself (e.g., machinery, devices, etc.). Images are provided as input to a convolutional neural network or similar for making predictions or decisions that can then be used to inform control logic. In accordance with the present disclosure, snapshots may be taken of an HMI and/or the line itself and then correlated with a data pipeline via screen scraping and/or image recognition.

To train a machine learning asset in accordance with the present example, HMI images may be leveraged that indicate overall process state at different points in time or historical commands or similar HMI data can be correlated with the data pipeline. Historical examples may be used to train the model so that the model is able to find correlations. The layout of an HMI can be utilized to automatically develop and train models that react or predict based on the state of HMI images. In some examples, an entire image may be leveraged for training or feeding the machine learning asset while in other examples just specific subsections of an image may be utilized. In this way, subtler information that may not be present or extractable in the process data can be discovered and utilized without the need for thorough visual inspection by an operator, data scientist, or similar user. A trained machine learning asset consumes samples of images over time and provides output such as detecting or predicting a dangerous environment before the data would normally trip or trigger a warning.

Currently, an operator may observe an HMI, think about it, and make a decision about what steps to take based on the visual indicators present in the HMI. However, by capturing manual inputs on visual screens shown over time, a machine learning asset can find corollaries based on past interactions, displayed data, and inputs into the control system. From this data, a model can be trained to make decisions without the need for additional operator input and/or inspection.

Moreover, images of an industrial process captured via camera can play similarly useful roles. There are certain things, such as specific types of quality issues, that cannot be represented in data because there is not the right instrumentation to do so, but they can be visually observed, typically by an operator. For example, there may be no sensor that captures the amount of debris on a roller, even though you may be able to get the resulting behavior from data. Thus, a camera may be used to collect images (or a video camera to collect videos) at certain points on an industrial line. Collected images or videos can then be provided to a machine learning asset trained to identify particular issues. The machine learning asset may then output a determination that informs control logic based on a condition of the line.

Thus, in industrial automation environment 300 one or more images may be captured of display 311 on HMI 310, wherein the images include all or part of the data shown in display 311. The data shown on HMI 310 is relevant to one or more devices on industrial line 320. The images of display 311 may then be provided to one or more machine learning models, which may include one or more of machine learning asset 139, machine learning asset 211, or machine learning asset 222 in some examples, in addition to other implementations of machine learning models. The one or more machine learning models are configured to then analyze the operating condition of the of one or more devices. Based on an output from the one or more machine learning models, an operating condition or status of the one or more devices can be identified, a prediction can be made, a decision can be made, or a similar action can be taken. In one example, HMI 310 may present a notification or alert to operator 305 based on the output. Alternatively, the output may be fed directly back into the process code such that immediate changes can be made.

Similarly, one or more images that are captured via camera 315 can be used as input to one or more machine learning models, wherein the images captured via camera 315 include a portion of industrial line 320. The one or more machine learning models are configured to then analyze an operating condition of one or more devices. Based on an output from the one or more machine learning models, an operating condition or status of the one or more devices can be identified, a prediction can be made, a decision can be made, or a similar action can be taken. In one example, HMI 310 may present a notification or alert to operator 305 based on the output. Alternatively, the output may be fed directly back into the process code such that immediate changes can be made.

Figure 4:
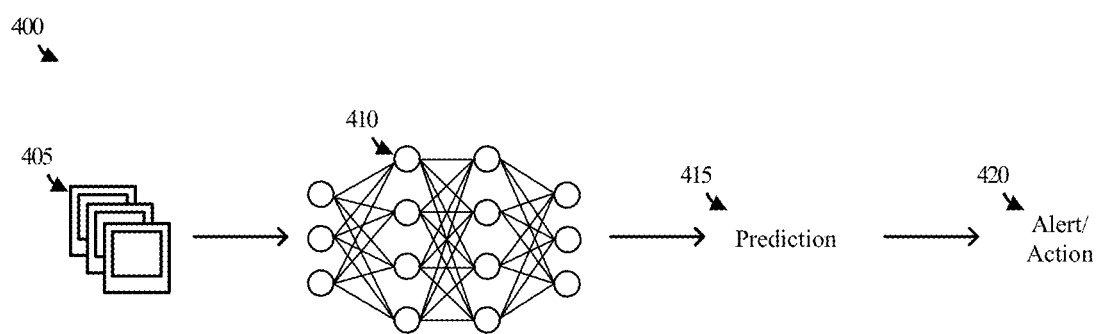
FIG. 4 illustrates a process for using live images from an industrial automation environment to inform industrial processes in accordance with some embodiments of the present technology.

FIG. 4 illustrates a process for using live images from an industrial automation environment to detect issues, make predictions, make decisions, and/or control an industrial process. Process 400 includes step 405 in which one or more images are collected and used as input into a machine learning model in step 410. The one or more images may comprise HMI snapshots, photos of the industrial process itself, or videos. In step 410, the images are provided as input to a convolutional neural network which is trained to analyze the images for one or more states indicative of an issue. The neural network then outputs its prediction in step 415, wherein the prediction comprises any output determined by the neural network in step 410 that may be indicative of a current status or future status of the industrial process. Finally, in step 420, an alert is produced or an action is taken based on the prediction. For example, an alert may be produced that can be displayed on the HMI or communicated to specific persons or devices. Alternatively, an action may be taken in response to the prediction, such as an adjustment of parameters, values, or settings or a more drastic measure such as shutting down the line, turning off an asset, or similar actions. Actions automatically taken in response to machine learning predictions may be largely applicable in autonomous industrial environments.

Figure 5:
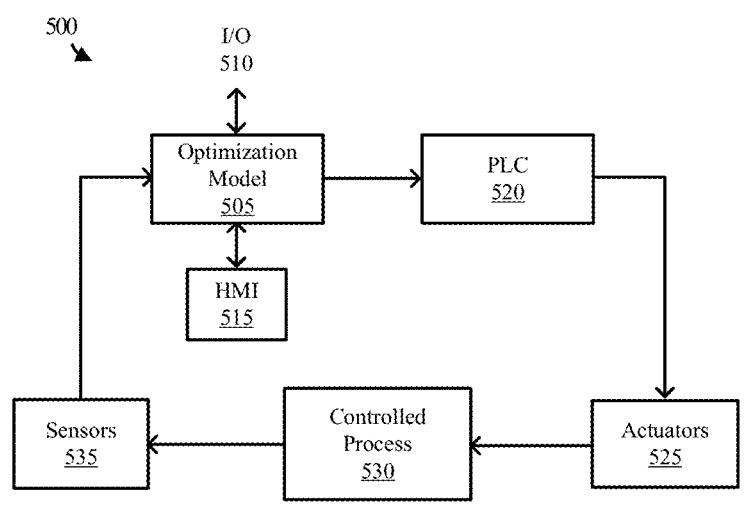
FIG. 5 illustrates the use of machine learning assets for asset optimization and multiple model orchestration in accordance with some embodiments of the present technology.

FIG. 5 illustrates an additional use for implementing machine learning assets into industrial control—asset optimization and multiple model orchestration. FIG. 5 comprises industrial control loop 500. Industrial control loop 500 includes optimization model 505, I/O 510, HMI 515, PLC 520, actuators 525, controlled process 530, and sensors 535. Industrial control loop 500 may be one embodiment of the industrial control loops illustrated in FIG. 2B or 2C. In industrial control loop 500, optimization model 505 is a machine learning model configured to optimize the operation of controlled process 530 according to a current model control scheme.

In accordance with the present disclosure, machine learning models may be used to optimize a specific asset or process according to a specific goal or model control scheme. For example, a first machine learning model may be built for optimizing the performance of an asset and may be used when an identified goal is to optimize the performance of said asset (i.e., the model control scheme optimizes performance). A second machine learning model may be built for optimizing the yield of the asset and may be used when the identified goal is to optimize the yield of the asset (i.e., the model control scheme optimizes yield). Thus, in accordance with the present disclosure, a pre-built set of models may be established for optimizing an industrial asset or industrial line, via the control code, according to what should be optimized at the time (i.e., performance, yield, energy consumption, etc.). When it is determined or indicated that something different should be optimized, the model, such as optimization model 505, may be swapped out for another model. Models may be swapped out manually or may be swapped out automatically in response to some external factor triggering the swap.

In some examples, models are pre-built for specific asset types and can be utilized by an industrial programmer or data scientist with little to no knowledge required as to how the model internally works. In some examples, plugging an optimization model into the control code may be all that is required of a programmer. In other examples, a programmer may be required to fine tune optimization models for their particular application.

An optimization model, in accordance with the present example, uses machine learning to inform or set parameters of control code in order to optimize for a specific goal. Over time, a model will learn how to optimally adjust parameters to meet the output goal based on various conditions that exist within a specific environment. A key aspect of the optimization technology described herein is that the model is working to fine-tune parameters and control code based on needs or goals—the model is not being fine-tuned to predict better, as may be performed by previous technologies.

In an example, optimization model 505 may be representative of a high-performance model wherein the process is optimized to produce as much product as possible. Then, for some external reason, it is determined that the process should now be optimized for yield rather than performance. Thus, optimization model 505 is automatically swapped for a high-yield model which then can be used to adjust control code to optimize yield and/or run a different model control scheme.

Determining which model to use and when to swap models may be based on external factors provided or learned via I/O 510. For example, it may be known that performance should be optimized, but only when energy costs are low. This logic may be built into control or overall model orchestration logic, wherein input is energy prices. Thus, if energy prices are high, optimization model 505 can be swapped with another model that is tuned for energy conservation, rather than having excessive costs or needing to shut down the line. In this example, the outputs from the model are the same as well as the way they are connected into the control code. However, the decisions the model makes will differ based on how the model is trained and what its tuned for.

In some examples, asset optimization and model orchestration may be performed in part based on external information—such as current energy prices in the previous example. However, in some examples, asset optimization and model orchestration may be performed in an entirely closed-loop environment without any live external data. Optimization and orchestration logic may make swapping decisions based on data changing within the loop, such as a degradation of controlled process 530, time of day, ambient air temperature, or any other factor that could similarly trigger a model swap.

Figure 6:
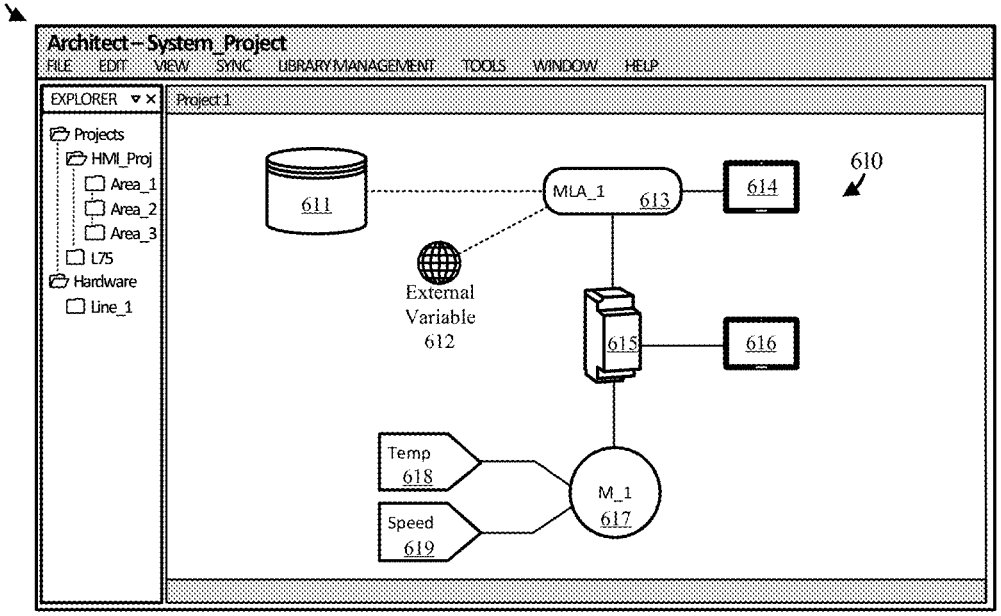
FIG. 6 illustrates a user interface environment for programming machine learning assets into industrial lines in accordance with some embodiments of the present technology.

FIG. 6 illustrates an example of a programming environment in which machine learning assets can be programmed into an industrial process. FIG. 6 includes user interface 600, which is representative of any user interface for generating control code. User interface 600 includes industrial line 610. Industrial line 610 includes database 611, external variable 612, machine learning asset 613, HMI 614, PLC 615, HMI 616, machine 617, temperature sensor 618, and speed sensor 619. Database 611 and external variable 612 can provide input to machine learning asset 613. Database 611 may comprise a model database that is operatively coupled to the industrial line such that machine learning asset 613 can be swapped with other models stored in database 611. External variable 612 may be representative of any external information that may be used as input to machine learning asset 613. Machine learning asset 613 is coupled to HMI 614, which displays information relevant to the status or control of machine learning asset 613. Machine learning asset 613 is coupled to PLC 615, which is coupled to HMI 616. HMI 616 displays information relevant to the status or control of PLC 615. Machine 617 is coupled to and driven by PLC 615. Temperature sensor 618 and speed sensor 619 measure temperature and speed associated with machine 617.

A programmer may develop or edit industrial line 610 within user interface 600 in accordance with the present disclosure. A programmer may have access to one or more libraries of models that can be used in industrial line 610. In some examples, models may be provided such that a programmer can "drag and drop" models into their project such as industrial line 610 and connect assets to the model in the same way that other assets are typically connected in the programming environment.

Figure 7:
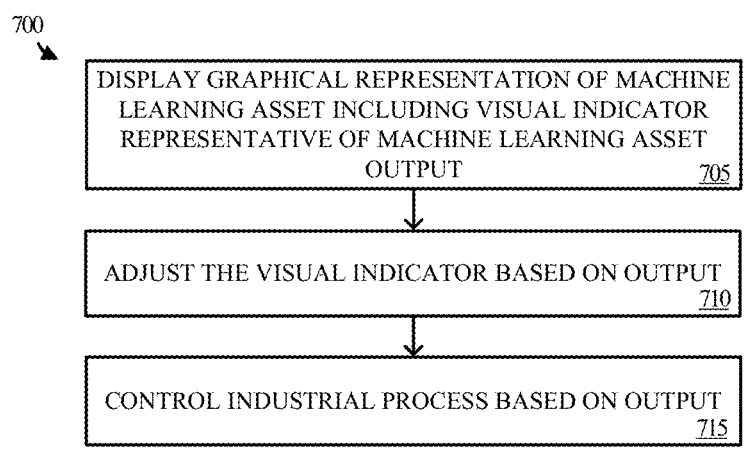
FIG. 7 illustrates a series of steps for utilizing machine learning assets in industrial automation environments in accordance with some embodiments of the present technology.

FIG. 7 illustrates process 700 for implementing machine learning models into industrial automation environments. In step 705, a computing system displays a graphical representation of a machine learning asset in an industrial automation environment, wherein the graphical representation includes a visual indicator representative of an output from the machine learning asset. In some embodiments, the machine learning asset comprises a model that uses operational data from the industrial process as input. In other embodiments, the machine learning asset comprises a model that uses external data obtained via a network as input. The graphical representation may include an option (e.g., a button or toggle) to turn the machine learning asset off, wherein turning the machine learning asset off comprises disconnecting the asset from the industrial process. The graphical representation may further include a menu for adjusting or tuning the machine learning asset.

In step 710, the computing system adjusts the visual indicator based on the output from the machine learning asset. The visual indicator may comprise one or more of many different representations such as charts, graphs, lines, numerical values, and the like. Examples of visual indicators may include those shown in faceplate 232 of FIG. 2D and display 311 of FIG. 3.

In step 715, the computing system controls an industrial process in the industrial automation environment based at least in part on the output from the machine learning asset. The industrial process, in accordance with the present example may include a plurality of industrial assets on an industrial line, or may include a single industrial asset or a portion of an industrial asset. In some embodiments, the computing system controls a second industrial process in the industrial automation environment based at least in part on the output from the machine learning asset. In an exemplary embodiment, operational data from the industrial process is provided back to the machine learning asset.

Figure 8:
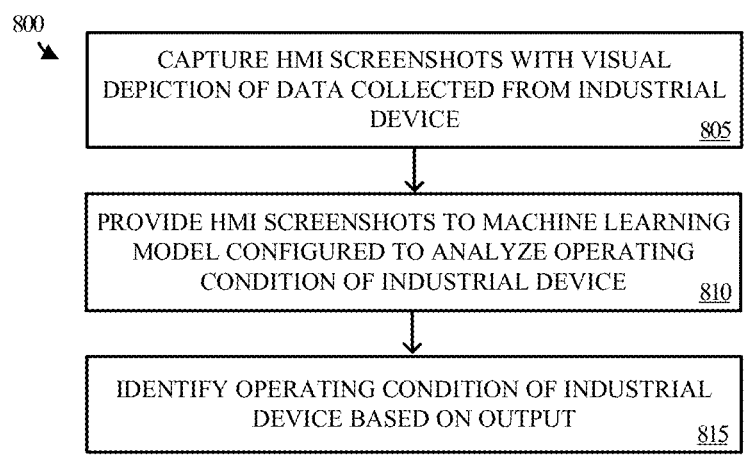
FIG. 8 illustrates a series of steps for utilizing machine learning assets in industrial automation environments in accordance with some embodiments of the present technology.

FIG. 8 illustrates process 800 for using HMI snapshots to identify operating conditions in an industrial automation environment. In step 805, a computing system captures one or more images of an HMI in an industrial automation environment, wherein the one or more images includes at least one visual depiction of data collected from an industrial device in the industrial automation environment. In step 810, the computing system provides the one or more images to a machine learning model configured to analyze an operating condition of the industrial device in the industrial automation environment, wherein the machine learning model, in some embodiments, is a convolutional neural network. In step 815, the computing system, based on an input of the machine learning model, identifies a current operating condition of the industrial device, wherein the current operating condition may be indicative of an issue related to the performance of the industrial device. In an exemplary embodiment, the computing system edits control logic for the industrial device based at least in part on the output of the machine learning model.

In addition to or instead of the HMI snapshots, the computing system may capture one or more images of the industrial device itself. The computing system may further provide the one or more images of the industrial device itself to a machine learning model configured to analyze an operating condition of the industrial device in the industrial automation environment, wherein the machine learning model may be the same machine learning model as in step 810 or may be a different machine learning model. Based on an output of the machine learning model, the computing system may identify a current operating condition of the industrial device. Process 800 may further include training the machine learning model to identify operating conditions of the industrial device based on historical images and/or training images.

Figure 9:
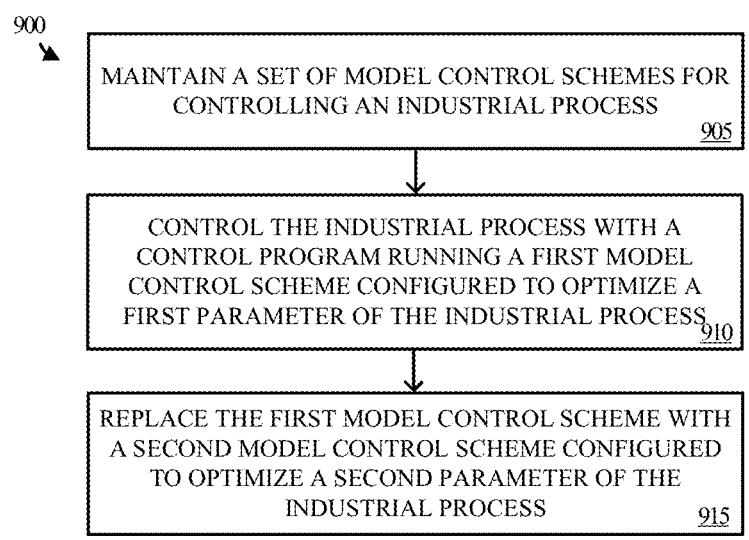
FIG. 9 illustrates a series of steps for utilizing machine learning assets in industrial automation environments in accordance with some embodiments of the present technology.

FIG. 9 illustrates process 900 for optimizing parameters in an industrial automation environment. In step 905, a computing system maintains a set of model control schemes for controlling an industrial process in the industrial automation environment, wherein each model control scheme comprises at least one machine learning model configured to optimize one or more parameters. In step 910, the computing system controls the industrial process with a control program running a first model control scheme from the set of model control schemes, wherein the first model control scheme is configured to optimize a first parameter of the industrial process. In step 915, the computing system is configured to replace the first model control scheme with a second model control scheme, wherein the second model control scheme is configured to optimize a second parameters of the industrial process, wherein the industrial process comprises running one or more industrial devices controlled by the control program on an industrial line. In one example, replacing the first model control scheme with the second model control scheme occurs in response to a direction to swap the first model control scheme out for the second. In an alternative example, replacing the first model control scheme with the second model control scheme occurs automatically in response to an indication that the second parameter should be optimized. In some embodiments, the first parameter comprises at least one of performance, yield, and energy conservation.

Figure 10:
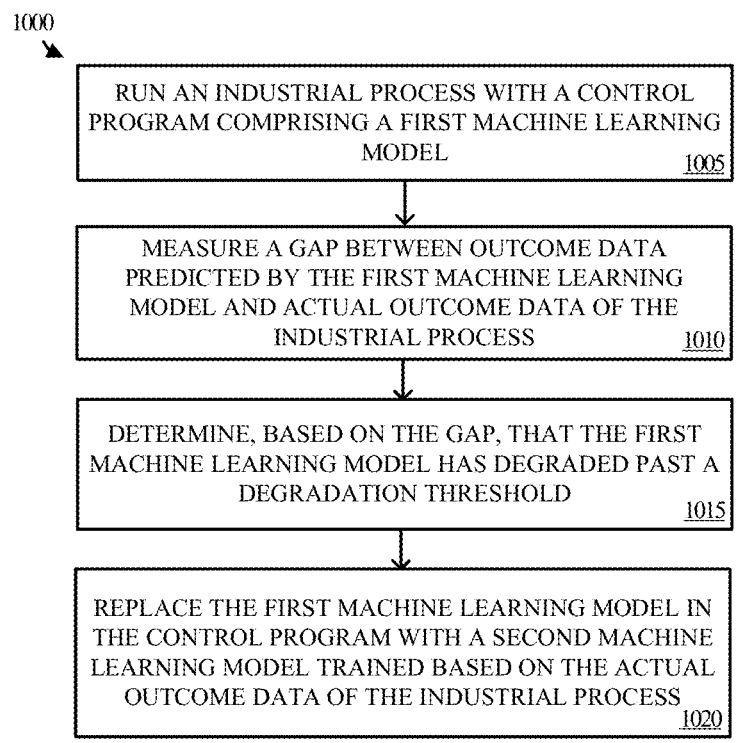
FIG. 10 illustrates a series of steps for utilizing machine learning assets in industrial automation environments in accordance with some embodiments of the present technology.

FIG. 10 illustrates process 1000 for performing model lifecycle management (MLM) in an industrial automation environment. In step 1005, a computing system runs an industrial process, in the industrial automation environment, with a control program, wherein the control program comprises a first machine learning model and the first machine learning model uses, in part, real-time data from the industrial process as input and produces parameter values used in the control program as output. In step 1010, the computing system measures a gap between outcome data predicted by the first machine learning model and outcome data of the industrial process. In step 1015, the computing system determines, based on the gap, that the first machine learning model has degraded past a degradation threshold. In step 1020, the computing system replaces the first machine learning model in the control program with a second machine learning model, wherein the second machine learning model is trained based at least in part on the actual outcome data of the industrial process.

In some embodiments, the second machine learning model of process 1000 is a retrained version of the first machine learning model. In other embodiments, the second machine learning model may be a new model. In certain examples, the computing system, prior to determining that the first machine learning model has degraded past the degradation threshold, adjusts the first machine learning model based on real-time data from the industrial process. In an example, the machine learning models in process 1000 are predictive models. However, in performing the steps of process 1000, the computing system may be running a prescriptive model wherein the prescriptive model is responsible for closing the gap in the residual. The steps of process 1000 may similarly be performed to manage lifecycles of prescriptive models. The model running in process 1000 may require automatic retraining or replacement itself and such model management is anticipated by the present model lifecycle management system. Moreover, in many examples, the industrial automation environment of process 1000 is an autonomous manufacturing environment.

Thus, as described in process 1000, machine learning models may be implemented to perform model lifecycle management and process optimization. Model lifecycle management, in accordance with the present discussion may serve to replace or improve traditional asset management in industrial automation environments. In process 1000, machine learning is used to track and/or recognize gaps (i.e., errors or residuals) between predictive and actual outcomes. A model inherently has a useful lifecycle as the environment around it changes. Over time, models become ubiquitous and can, in essence, wear out, just like any other machine or sensor on an industrial line. Once degradation of a model starts, it is advantageous to retrain the model, change inputs or parameters of the model, or train a new model to replace it. To perform these prescriptive tasks, optimization models are used to solve for what and how to change the model—that is, which variables to change and how to change them, when and how to retrain the model, and when and how to replace the model. In this way, models can be scheduled for updates, maintenance, and even repair in a predictive and automated fashion. Lifecycle management models within an autonomous manufacturing plant may operate at different levels of control—models may optimize control variables, assets, lines, or even entire plant schedules.

In accordance with the present disclosure, machine learning may be utilized in lifecycle management of models that are focused on the closed-loop control of assets in production lines and manufacturing, as well as in the management of models that exist in open-loop settings. The models in an industrial automation environment may require consistent monitoring, evaluation, reparameterization, and retraining, and this process is ideally done in the context of the machines being controlled or the processes being optimized. MLM models may advantageously be responsible for evaluating the performance of each asset in a line in a plant at all levels and understanding how their performance relates to the performance of models that are autonomously driving those assets. From this information, an MLM model automatically determines what should be done to the models to upkeep them, retrain them, reevaluate them, and the like. In effect, the model lifecycle management component of the industrial automation environment becomes a discipline that is integrated into the overall process and management procedures, operating on both the predictive and the prescriptive side to manage all levels in an integrated fashion.

In order to retrain a model or train new models, the prediction error may be used as feedback into one or more models such that the error itself can be used to train the model. In an example, a first model is running and has a certain level of accuracy or certain error between the predicted and the actual data. A second model is then used which targets the reduction of the error itself. In some examples, a gradient-boosted tree may be used to perform this reduction of error task. The second model may be running at all times such that there is continuous effort to improve the first model's error with automated re-training or re-learning, or the second model may alternatively only run at prescribed times. However, in both instances, the models may be used simultaneously with operation—that is, there is no need to shut down the line and retrain a model as it falls out of tune.

In an example, the MLM system described herein is implemented in an autonomous tire manufacturing plant that has several core process areas and classes of assets required to run the plant effectively: mixing, extrusion, assembly, curing, and inspection. In a typical tire manufacturing scenario, a plant manager may be personally responsible for observing performance, consistency, and quality at each stage of production. Under this scenario, the performance of a plant may be primarily a consequence of how well-conditioned the physical assets are and how well the control logic is implemented into the PLCs for controlling the assets. However, using machine learning to implement the optimization process, the performance in each area becomes a consequence of how effective the MLM models are that are autonomously controlling the processes. For example, performance may be a measure of how effective the model is that controls a splicing operation, how effective the models are that control mixing, energy, time, and power curves to obtain optimal viscosity, or how effective the models are that control the temperature, pressure, and time dynamics of the vulcanization process.

In the example of the tire manufacturing plant, a model may be in use that controls the curing process, wherein the model predicts that a certain combination of temperature, energy, time, and pressure inputs will produce a certain vulcanization output. To assess the accuracy of that prediction, the gap between the predicted output and the actual output is measured to obtain the error or residual. This gap is monitored over time and the model may be continually adjusted or trained such that the gap actually shrinks over time rather than grows. Once an inflection point appears indicating degradation, the MLM system may determine that one or multiple actions are required including retraining the model with new data, adding a new variable or new parameters, changing a variable or parameter, implementing a different modeling configuration, or performing a form of maintenance on the model. Thus, the mathematical metric, or the error, is used to kick off the model maintenance process, wherein the MLM platform is used to organize and automate the process along the way.

Figure 11:
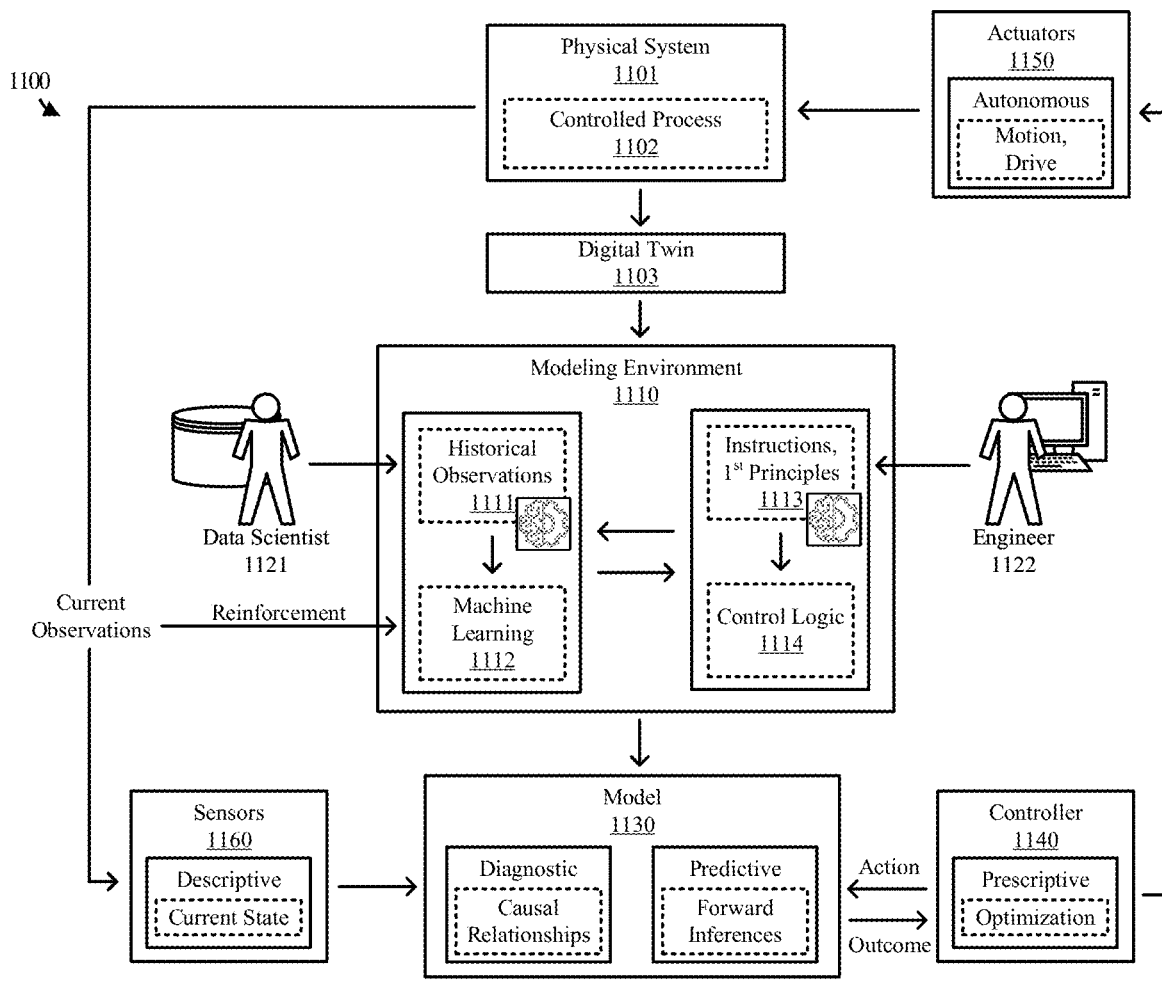
FIG. 11 illustrates an overview of an industrial automation environment in which aspects of the present technology are implemented.

FIG. 11 illustrates an overview of an industrial automation environment wherein machine learning models are implemented for various purposes as described herein. FIG. 11 includes automation environment 1100. Automation environment 1100 comprises physical system 1101 including controlled process 1102. Automation environment 1100 further comprises digital twin 1103 and modeling environment 1110. Modeling environment 1110 comprises historical observations 1111, machine learning 1112, instructions and first principles 1113, and control logic 1114. Automation environment 1100 further comprises data scientist 1121, engineer 1122, model 1130, controller 1140, actuators 1150, and sensors 1160.

In the example of FIG. 11, digital twin 1103 of physical system 1101 is provided to modeling environment 1110, wherein modeling environment 1110 is used by both data scientist 1121 and engineer 1122. In one embodiment, data scientist 1121 accessed modeling environment 1110 through a different application than engineer 1122. In an alternative embodiment, data scientist 1121 and engineer 1122 use the same application for their data science and engineering purposes. In either embodiment, information from the data science portion of the modeling environment and the engineering portion of the modeling environment is shared and accessible for both functions—data scientist 1121 can access contextual engineering data in performing data science tasks and engineer 1122 can access operational data and data science tools. As shown, a machine learning-based engine is provided in both the engineering environment and the data science environment. Functionality of the machine learning-based engines may include generating recommendations, auto-completion functionality, providing contextual information, and other functionalities described herein. Instructions and first principles 1113 is used to generate control logic 1114. Engineer 1122 may utilize operational data or similar from the data science environment in producing both instructions and first principles 1113 and control logic 1114. In some examples, a machine learning-based recommendation engine recommends adding components or editing control logic based in part on historical observations 1111 and machine learning 1112.

Model 1130 is representative of one or more machine learning models implemented in control code for controlling controlled process 1102. The one or more machine learning models may include predictive models for generating forward inferences and diagnostic models for identifying causal relationships. Model 1130 includes one or more machine learning models that produces control logic as output for controller 1140. Controller 1140 runs one or more prescriptive models for optimizing controlled process 1102 or a portion of controlled process 1102. Controller 1140 controls actuators 1150 which actuate physical system 1101 to perform controlled process 1102. Actuators 1150 comprise one or more machine learning models for autonomous driving of physical system 1101. Sensors 1160 collect data from physical system 1101 running controlled process 1102. Sensors 1160 comprise one or more machine learning models for describing output and current state from controlled process 1102. Output from controlled process 1102 is also provided to modeling environment 1110 and may be used for data science and/or engineering purposes.

Figure 12:
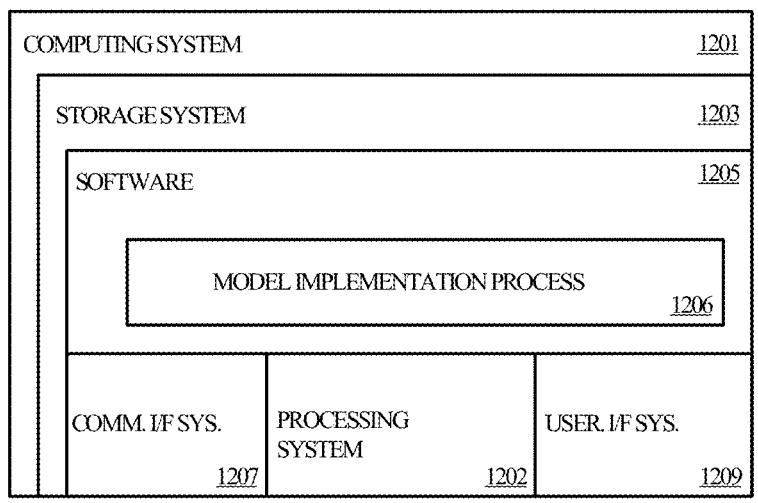
FIG. 12 illustrates an example of a computing device that may be used in accordance with some embodiments of the present technology.

FIG. 12 illustrates computing system 1201 to perform machine learning model implementation according to an implementation of the present technology. Computing system 1201 is representative of any system or collection of systems with which the various operational architectures, processes, scenarios, and sequences disclosed herein for utilizing machine learning models within industrial automation environments may be employed. Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1103. Software 1105 includes and implements model implementation process 1206, which is representative of any of the model utilization processes discussed with respect to the preceding Figures, including but not limited to the industrial control, model faceplates, asset optimization, and HMI snapshots. When executed by processing system 1202 to provide model implementation functions, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Referring still to FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including model implementation process 1206) may be implemented in program instructions and among other functions may, when executed by processing system 1202, direct processing system 1202 to operate as described with respect to the various operational scenarios, sequences, and processes illustrated herein. For example, software 1205 may include program instructions for running optimization models in closed-loop industrial automation settings as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide machine learning functionality to an industrial automation environment as described herein. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of a firmware extension development or deployment device, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for analyzing operating conditions in industrial automation environments, the system comprising:
   a memory that stores executable components; and a processor, operatively coupled to the memory, that executes the executable components, the executable components comprising:
an image reception component configured to obtain:
one or more images of a human-machine interface in an industrial automation environment, wherein the one or more images of the human-machine interface include at least one visual depiction of data collected from an industrial device in the industrial automation environment; and
one or more images of the industrial device captured in the industrial automation environment;
an input component configured to provide the one or more images of the human-machine interface and the one or more images of the industrial device to a machine learning model trained to analyze an operating condition of the industrial device in the industrial automation environment based on the one or more images of the human-machine interface and the one or more images of the industrial device; and
a determination component configured to, based on an output of the machine learning model, identify a current operating condition of the industrial device, wherein the current operating condition is indicative of at least one issue related to performance of the industrial device.

2. The system of claim 1, wherein the executable components further comprise a control component configured to edit control logic for the industrial device based at least in part on the output of the machine learning model.

3. The system of claim 1, wherein the executable components further comprise a notification component configured to generate a notification in a user interface of the system indicating a presence of the at least one issue related to the performance of the industrial device.

4. The system of claim 1, wherein the executable components further comprise:
an image capture component configured to capture the one or more images of the industrial device; and
a screen capture component configured to capture the one or more images of the human-machine interface.

5. The system of claim 1, wherein the machine learning model comprises a convolutional neural network.

6. The system of claim 1, wherein the executable components further comprise a training component configured to train the machine learning model to identify operating conditions of the industrial device based on the one or more images of the human-machine interface and the one or more images of the industrial device.

7. A non-transitory computer-readable medium having stored thereon instructions to support analyzing operating conditions that, in response to execution, cause a system comprising a processor to perform operations, the operations comprising:
obtaining:
one or more images of a human-machine interface in an industrial automation environment, wherein the one or more images of the human-machine interface include at least one visual depiction of data collected from an industrial device in the industrial automation environment; and
one or more images of the industrial device captured in the industrial automation environment;
providing the one or more images of the human-machine interface and the one or more images of the industrial device to a machine learning model trained to analyze an operating condition of the industrial device in the industrial automation environment based on the one or more images of the human-machine interface and the one or more images of the industrial device; and
based on an output of the machine learning model, identifying a current operating condition of the industrial device, wherein the current operating condition is indicative of at least one issue related to performance of the industrial device.

8. The non-transitory computer-readable medium of claim 7, the operations further comprising editing control logic for the industrial device based at least in part on the output of the machine learning model.

9. The non-transitory computer-readable medium of claim 7, the operations further comprising generating a notification in a user interface indicating a presence of the at least one issue related to the performance of the industrial device.

10. The non-transitory computer-readable medium of claim 7, the operations further comprising:
capturing the one or more images of the industrial device; and
capturing the one or more images of the human-machine interface.

11. The non-transitory computer-readable medium of claim 7, wherein the machine learning model comprises a convolutional neural network.

12. The non-transitory computer-readable medium of claim 7, the operations further comprising training the machine learning model to identify operating conditions of the industrial device based on the one or more images of the human-machine interface and the one or more images of the industrial device.

13. A method for analyzing operating conditions in industrial automation environments, the method comprising:
obtaining-capturing, by a system comprising a processor:
one or more images of a human-machine interface in an industrial automation environment, wherein the one or more images of the human-machine interface include at least one visual depiction of data collected from an industrial device in the industrial automation environment; and
one or more images of the industrial device captured in the industrial automation environment;
providing, by the system, the one or more images of the human-machine interface and the one or more images of the industrial device to a machine learning model trained to analyze an operating condition of the industrial device in the industrial automation environment based on the one or more images of the human-machine interface and the one or more images of the industrial device; and
based on an output of the machine learning model, identifying, by the system, a current operating condition of the industrial device, wherein the current operating condition is indicative of at least one issue related to performance of the industrial device.

14. The method of claim 13, further comprising editing, by the system, control logic for the industrial device based at least in part on the output of the machine learning model.

15. The method of claim 13, wherein the method further comprises generating, by the system, a notification in a user interface of the system indicating a presence of the at least one issue related to performance of the industrial device.

16. The method of claim 13, further comprising:
capturing, by the system, the one or more images of the industrial device; and
capturing, by the system, the one or more images of the human-machine interface.

17. The method of claim 13, further comprising training the machine learning model to identify operating conditions of the industrial device based on the one or more images of the human-machine interface and the one or more images of the industrial device.

18. The method of claim 13, wherein the machine learning model comprises a convolutional neural network.

* * * * *